United States Patent
Niu et al.

(10) Patent No.: US 10,243,889 B2
(45) Date of Patent: Mar. 26, 2019

(54) KEYWORD BASED AUTOMATIC REPLY GENERATION IN A MESSAGING APPLICATION

(71) Applicant: Tencent Technology (Shenzhen) Company Limited, Shenzhen (CN)

(72) Inventors: Xun Niu, Shenzhen (CN); Yanan Zhao, Shenzhen (CN); Jihua Huang, Shenzhen (CN); Haiyang Wang, Shenzhen (CN); Yuhao Chen, Shenzhen (CN); Yan Qi, Shenzhen (CN); Jiyan Huang, Shenzhen (CN); Zhaohong Ma, Shenzhen (CN); Guodong Zhang, Shenzhen (CN); Jing Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 644 days.

(21) Appl. No.: 14/711,636

(22) Filed: May 13, 2015

(65) Prior Publication Data

US 2015/0281138 A1  Oct. 1, 2015

Related U.S. Application Data

(63) Continuation of application No. PCT/CN2014/082446, filed on Jul. 18, 2014.

(30) Foreign Application Priority Data

Jul. 19, 2013  (CN) .......................... 2013 1 0305762

(51) Int. Cl.
G06F 17/30 (2006.01)
H04L 12/58 (2006.01)
(Continued)

(52) U.S. Cl.
CPC ........ *H04L 51/02* (2013.01); *G06F 17/30867* (2013.01); *G06F 17/30905* (2013.01);
(Continued)

(58) Field of Classification Search
CPC ......... H04L 51/02; H04L 67/02; H04L 67/42; H04L 51/04
(Continued)

(56) References Cited

U.S. PATENT DOCUMENTS 7,177,796 B1   2/2007 Damerau et al.
2005/0044213 A1*  2/2005 Kobayashi .............. H04L 43/10
                                                      709/224
(Continued)

FOREIGN PATENT DOCUMENTS

CN     1530868 A    9/2004
CN     1719404 A    1/2006
(Continued)

OTHER PUBLICATIONS

Tencent Tech, ISRWO, PCT/CN2014/082446, dated Oct. 27, 2014, 7 pgs.
(Continued)

*Primary Examiner* — Aaron N Strange
(74) *Attorney, Agent, or Firm* — Morgan, Lewis & Bockius LLP

(57) ABSTRACT

The present application discloses a method of generating an automatic reply (auto-reply) message. A server receives a text message directed to a content provider, and obtains content information of a webpage associated with the content provider. The content information of the webpage includes predetermined tags and information concerning content items of the webpage. The server then composes an auto-reply message according to a specific keyword of the text message, and specifically, information of at least one
(Continued)

content item is extracted according to an auto-reply rule. The auto-reply rule is included in an auto-reply rule database that further includes a plurality of keywords and the content items of the webpage semantically correlated with the keywords based on the set of predetermined tags. The server then returns the auto-reply message including the information of the at least one content item corresponding to the specific keyword for display on the client device.

20 Claims, 10 Drawing Sheets

(51) Int. Cl.
 *H04L 29/06* (2006.01)
 *H04L 29/08* (2006.01)
(52) U.S. Cl.
 CPC ............ *H04L 51/063* (2013.01); *H04L 67/02* (2013.01); *H04L 67/42* (2013.01); *H04L 51/04* (2013.01)
(58) Field of Classification Search
 USPC .......................................................... 709/206
 See application file for complete search history.

(56) References Cited

U.S. PATENT DOCUMENTS

| | | | |
|---|---|---|---|
| 2006/0047615 | A1 | 3/2006 | Ravin et al. |
| 2007/0083894 | A1* | 4/2007 | Gonsalves .......... G06F 17/3089 |
| | | | 725/46 |
| 2007/0260694 | A1 | 11/2007 | Boss et al. |
| 2009/0077185 | A1 | 3/2009 | Chiu et al. |
| 2009/0305676 | A1* | 12/2009 | Zhang .................. G06Q 10/107 |
| | | | 455/412.1 |
| 2013/0317808 | A1* | 11/2013 | Kruel ...................... H04L 51/32 |
| | | | 704/9 |
| 2014/0136569 | A1 | 5/2014 | Miller et al. |

FOREIGN PATENT DOCUMENTS

| | | |
|---|---|---|
| CN | 1932817 A | 3/2007 |
| CN | 101076184 A | 11/2007 |
| CN | 101127050 A | 2/2008 |
| CN | 101477571 A | 7/2009 |
| CN | 103647696 A | 3/2014 |

OTHER PUBLICATIONS

Tencent Tech, ISRWO, PCT/CN2014/082476, dated Apr. 21, 2015, 11 pgs.

\* cited by examiner

On a server system having one or more processors and memory storing one or more programs for execution by the one or more processors: —20A Receive, from a client device, a text message directed to a content provider, the text message including a specific keyword 21

Obtain content information of a webpage associated with the content provider, the content information of the webpage comprising a set of predetermined tags and information concerning a plurality of content items that are displayed together in the webpage 22

In accordance with the specific keyword of the text message, compose an auto-reply message by extracting information of at least one content item from the webpage according to an auto-reply rule associated with the specific keyword 23

The auto-reply rule is included in an auto-reply rule database that comprises a plurality of keywords including the specific keyword 23A Each of the plurality of keywords is semantically correlated with respective one or more content items of the webpage based on the set of predetermined tags in the content information of the webpage 23B Return the auto-reply message that includes the information of the at least one content item corresponding to the specific keyword for display on the client device 24

FIG. 2A

KEYWORD BASED AUTOMATIC REPLY GENERATION IN A MESSAGING APPLICATION

RELATED APPLICATIONS

This application is a continuation application of PCT Patent Application No. PCT/CN2014/082446, entitled "KEYWORD BASED AUTOMATIC REPLY GENERATION IN A MESSAGING APPLICATION" filed on Jul. 18, 2014, which claims priority to Chinese Patent Application No. 201310305762.8, entitled "METHOD AND APPARATUS FOR GENERATING A KEYWORD AUTO-REPLY CORRELATION IN INSTANT MESSAGING," filed on Jul. 19, 2013, both of which are incorporated by reference in their entirety.

This application relates to U.S. patent application Ser. No. 14/711,601, entitled "METHODS AND SYSTEMS FOR CREATING AUTO-REPLY MESSAGES", which is a continuation application of PCT Patent Application No. PCT/CN2014/082476, entitled "METHODS AND SYSTEMS FOR CREATING AUTO-REPLY MESSAGES" filed on Jul. 18, 2014, which claims priority to Chinese Patent Application No. 201310305682.2, entitled "METHOD AND APPARATUS FOR GENERATING AUTO-REPLY MESSAGE IN INSTANT MESSAGING," filed on Jul. 19, 2013, both of which are incorporated by reference in their entirety.

TECHNICAL FIELD

The disclosed implementations relate generally to the field of internet data communication, and in particular, to methods and systems of generating a keyword based auto-reply message on a communication platform of an email message application, a social network application, an instant messaging application and the like.

BACKGROUND

An instant messaging (IM) application is often used to exchange and process information in real time over the Internet. In particular, an IM application allows two or more users of different terminals to communicate with each other instantly by exchanging text messages, documents, voice and video clips over an available communication network. Examples of popular IM applications include MiChat, YY voice, QQ, WeChat, Baidu Hi, Sina UC, Alitalk, Fetion, WhatsApp, Facebook Messenger, Twitter, and Skype Messenger.

In addition to the communication function, some IM applications also provide public platforms, support friend circles, and push messages to their users. For example, in WeChat, a user may add a friend by using a built-in function, WeChat Shake, by searching for a specific number, by searching for a user in the vicinity, or by scanning a two-dimension quick reference (QR) code, and thereby, set up a friend circle among his or her added friends. The user may also subscribe to a public platform managed by a webmaster, and receive information and updates from posted by the webmaster on the public platform. The user may also post information in his or her friend circle or on the public platform.

A public platform provided by an IM application allows a user (an individual or a company) who normally registers the public platform under a public account to share textual, video and audio information with a specific group of people. The specific group of people is subscribers of this public platform which is normally managed by a webmaster. These subscribers may send inquiries and requests on the public platforms, and for the sake of efficiency, some IM applications provide a keyword based automatic reply (auto-reply) function to reply to these inquires and requests automatically. For example, in WeChat, the user of the public account may specify a specific auto-reply message according to a keyword, and this specific auto-reply message may includes texts, pictures, audios and/or videos associated with the keyword. Further, in a specific example, a keyword of "company profile" is correlated with a company profile website, and according to such a correlation, the auto-reply message associated with the keyword of "company profile" includes a link to the company profile website. When a subscriber sends a message containing the keyword of "company profile" to this public account, the public account will automatically reply to the subscriber a message containing the link to the company profile website.

There are two existing methods in prior art for generating an auto-reply message based on a specific keyword. The first method involves online editing using a keyword based auto-reply editor that is embedded in an IM based public platform. The auto-reply editor includes a keyword box, and a message body box in which a user manually fills the specific keyword and the content of the auto-reply message correlated with the specific keyword, respectively. During this course of creating the keyword based auto-reply message, the user has to manually edit the message body, upload certain IM message materials (e.g., pictures, audio or video files), and/or associate the auto-reply message with content items of a webpage. After the auto-reply message is composed for the specific keyword, it is stored in association with the corresponding public account by a server that manages the IM messaging application.

The second method of generating a keyword based auto-reply message involves importing a data file that is created according to a specific format. This data file includes a keyword and content of the auto-reply message correlated with the keyword, which are manually arranged in the data file according to the specific format. During the course of creating this keyword based auto-reply message, the user also has to manually edit the message body, enter links to certain IM message materials (e.g., pictures, audio or video files), and/or associate the auto-reply message with a webpage. This data file is also stored in association with the corresponding public account by a server that manages the IM messaging application, and may be extracted for generating the auto-reply message automatically in response to a subscriber's inquiry or request containing the specific keyword.

Despite their acceptable performance, the above two methods are plagued with some technical problems. Specifically, each auto-reply message of a public account has to be created in a manual manner, and corresponding manual operations are normally complicated, resulting in low operating efficiency and low accuracy rates. When an auto-reply message needs to be changed, (e.g., when the above-mentioned company profile webpage changes), the auto-reply message associated with a specific keyword has to be edited manually to reflect the change. Thus, maintenance of the correlation between the keyword and the auto-reply message is complicated, which demands an intensive labor and results in a relatively high labor cost.

SUMMARY

The above deficiencies and other problems associated with the conventional approaches of network communication are reduced or eliminated by the application disclosed below. In some embodiments, the application is implemented in a client device that has one or more processors, memory and one or more modules, programs or sets of instructions stored in the memory for performing multiple functions. Instructions for performing these functions may be included in a computer program product configured for execution by one or more processors.

One aspect of the application is a method implemented on a server system for generating an automatic reply (auto-reply) message. The method includes receiving, from a client device, a text message directed to a content provider, the text message including a specific keyword, and obtaining content information of a webpage associated with the content provider. The content information of the webpage includes a set of predetermined tags and information concerning a plurality of content items that are displayed together in the webpage. The method further includes in accordance with the specific keyword of the text message, composing an auto-reply message by extracting information of at least one content item from the webpage according to an auto-reply rule associated with the specific keyword, wherein the auto-reply rule is included in an auto-reply rule database that includes a plurality of keywords including the specific keyword. Each of the plurality of keywords is semantically correlated with respective one or more content items of the webpage based on the set of predetermined tags in the content information of the webpage. The method further includes returning the auto-reply message that includes the information of the at least one content item corresponding to the specific keyword for display on the client device.

Another aspect of the application is a server system that includes one or more processors and memory having at least one program (including instructions) stored thereon, which when executed by the one or more processors cause the processors to perform operations to create an auto-reply message. The at least one program stored on the memory includes instructions for causing the server system to perform the method described above.

Another aspect of the present application is a non-transitory computer readable storage medium that stores at least one program configured for execution by at least one processor of a server system. The at least one program includes instructions for causing the server system to perform the method described above.

Other embodiments and advantages may be apparent to those skilled in the art in light of the descriptions and drawings in this specification.

BRIEF DESCRIPTION OF DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

FIG. 2A illustrates a flow chart representing a method for generating an auto-reply message on a server system in response to a text message received from a client device in accordance with some embodiments of the application.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be obvious to one skilled in the art that the subject matter may be practiced without these specific details. In other instances, well-known methods, procedures, components, modules, and circuits have not been described in detail so as not to unnecessarily obscure aspects of the embodiments.

In order to make a clear understanding of purposes, technical schemes and advantages of the present application, the present application is described in detail below with reference to the attached drawings. The described embodiments are merely examples of the present application, not the whole present application. In addition to the embodiments of the present application, all the other embodiments obtained by those skilled in the art without any creative labor belong to the protective scope of the present application.

In the present application, the keyword auto-reply correlation means the correlation between the keyword belonging to the public account and its corresponding automatic reply message in the public platform system of IM, which is referred to as the keyword auto-reply correlation for short. In each keyword auto-reply correlation of each public account, one or more keywords and replay message contents mapping with the keywords may be included.

Figure 1:
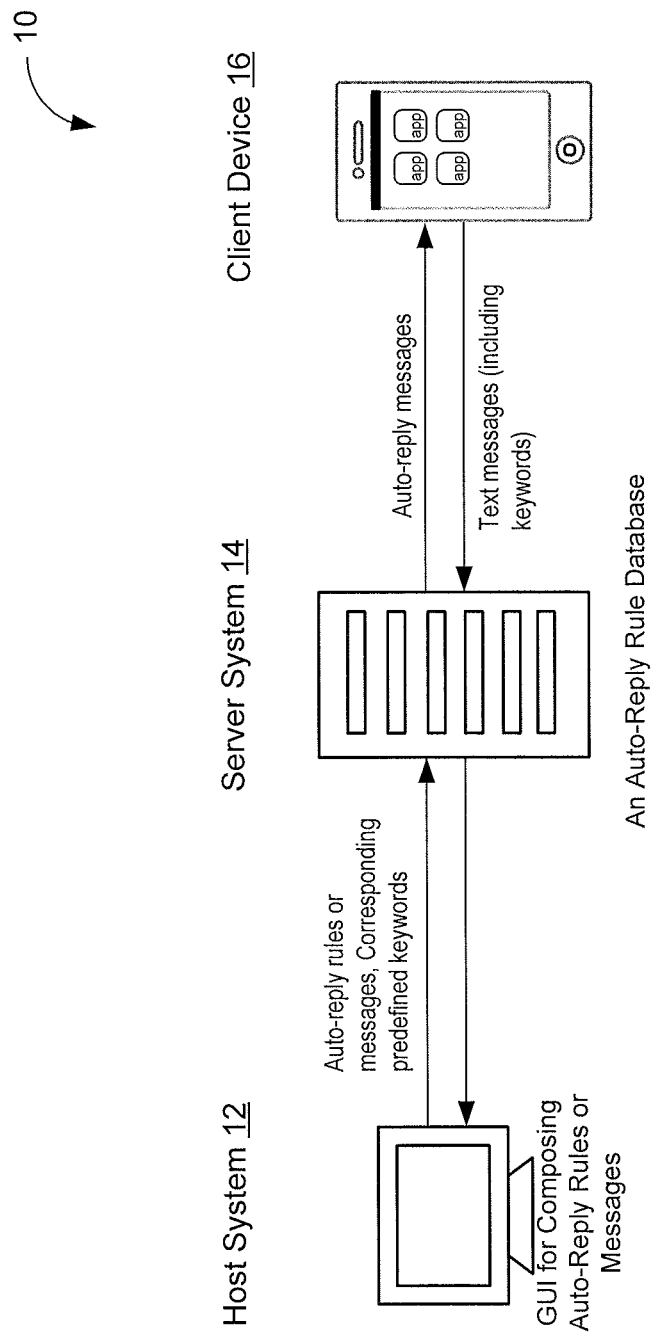
FIG. 1 illustrates an exemplary process for generating an auto-reply message and using the auto-reply message in accordance with some embodiments of the application.

FIG. 1 illustrates an exemplary process 10 for generating an auto-reply message and using the auto-reply message in accordance with some embodiments of the application. Process 10 optionally involves a host system 12, a server system 14 and one or more client devices 16. In accordance with process 10, host system 12 loads a graphical user interface (GUI), and the GUI allows a webmaster to determine a plurality of auto-reply rules for composing auto-reply messages based on a webpage managed by the webmaster. Once the auto-reply rules are determined, they are transferred from host system 12 to server computer 14. Server computer 14 stores the auto-reply rules in an auto-reply rule database. Specifically, in accordance with a specific auto-reply rule, a corresponding auto-reply message is configured to include some or all content information of the webpage based on one or more specific keywords received in the user inquiry.

When server computer 14 receives a user inquiry (sometimes in a format of a text message) from a client device 16, it identifies a specific keyword in the user inquiry and an auto-reply rule corresponding to the specific keyword. In accordance with the auto-reply rule, server computer 14 further composes an auto-reply message to include the content information of the webpage associated with the specific keyword. The composed auto-reply message is then sent to client device 16 in response to the user inquiry. Therefore, this auto-reply message is composed according to the auto-reply rule corresponding to the specific keyword received in user inquiry, and includes specific content items of the webpage associated with the specific keyword.

It is noted that the auto-reply rules define correlations between keywords and content items included in the webpage. In some implementations, such keyword-content correlations are determined by a webmaster of the public account that responds to its subscribers' inquiries. Specially, the GUI displayed on host system 12 enables the webmaster to manually link the content items of the webpage with the auto-reply message based on one or more keywords. Therefore, a corresponding auto-reply rule includes a correlation between the linked content items of the webpage and the one or more keywords.

In some embodiments, client device 16 is configured to enable the subsequent user inquiry and receive the auto-reply message on a communication platform selected from an email message application, a social network application, an instant messaging application and the like. For example, a user of client device 16 is a subscriber to a public account in a WeChat application. Therefore, the user of client device 16 relies on a WeChat interface made available on client device 16 to enter the user inquiry and receive the auto-reply message returned by server system 14.

Further, in this example, the public account provides information concerning products or services to a large number of subscribers on the WeChat platform. A convenient way to respond to inquiries made by the large number of subscribers is to create an auto-reply reply database that includes some auto-reply rules for creating auto-reply messages automatically in anticipation of the subscribers' potential inquiries. When the WeChat platform is applied to support this public account, the subscribers' inquiries are communicated on this platform, and the auto-reply messages generated based on the auto-reply rules are also formatted according to the requirements of the WeChat application. Accordingly, server system 14 has to take into consideration the WeChat's format requirements, when it composes the auto-reply message.

Various embodiments of the present application are focused on creating auto-reply messages on server system 14 based on auto-reply rules stored in an auto-reply database, and sending the created auto-reply message in response to subsequent user inquiries received from client devices 16. Optionally, an auto-reply rule is automatically generated based on a set of predetermined tags in the content information of the webpage. However, in some situations, the auto-reply rules stored in the auto-reply database of server system 14 are defined by a webmaster via a GUI rendered on host system 12. Host system 12 is optionally another client device 16 except that a webmaster of a public account may access the corresponding public account on a communication platform on host system 12.

In some implementation, the GUI display used to define the auto-reply rules on host system 12 is embedded in the communication application (e.g., WeChat). Alternatively, in some implementations, the GUI display of host system 12 is developed as an independent application, and may create auto-reply rules that are compatible with different communication platforms.

FIG. 2A illustrates a flow chart representing a method 20A for creating an auto-reply message on server system 14 in accordance with some embodiments of the application. Method 20A is, optionally, governed by instructions that are stored in a non-transitory computer readable storage medium and that are executed by one or more processors of a host system (e.g., server system 14). Each of the operations shown in FIG. 2A may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 20A may be combined and/or the order of some operations may be changed.

Server system 14 receives (21), from a client device, a text message directed to a content provider, and the text message includes a specific keyword. The text message includes a user inquiry or a user request concerning products or services provided by the content provider. In some embodiments, client device 16 is configured to enable the text message on a communication platform selected from an email message application, a social network application, an instant messaging application and the like. In a specific example, the text message is created on a WeChat application on client device 16. A webmaster maintains a public account on WeChat on behalf of the content provider, and a subscriber of the public account sends his inquiry or request on WeChat to the public account for the information of the content provider's products and services.

To respond to the text message, server system 14 obtains (22) content information of a webpage associated with the content provider, and the content information of the webpage includes a set of predetermined tags and information concerning a plurality of content items that are displayed together in the webpage. In some embodiments, host system 12 uses a webpage link to access the webpage, and downloads the content information of the webpage from a web server that sponsors the webpage. Therefore, in some embodiments, the content information of the webpage includes HTML source codes of the webpage, and the HTML source codes further include HTML tags and links to the plurality of content items.

The plurality of content items at least include textual content and pictures. In some embodiments, the plurality of content items includes video clips and/or audio clips. Further, in some embodiments, the content items of the webpage include a title and a uniform resource locator (URL) address of the webpage.

As explained above, the text message received from client device 16 includes the specific keyword. Therefore, in accordance with the specific keyword of the text message, server system 14 further composes (23) an auto-reply message by extracting information of at least one content item from the webpage according to an auto-reply rule associated with the specific keyword. Specifically, the auto-reply rule is included (23A) in an auto-reply rule database that includes a plurality of keywords including the specific keyword, and each of the plurality of keywords is semantically correlated (23B) with respective one or more content items of the webpage based on the set of predetermined tags in the content information of the webpage.

In some implementations, the auto-reply rule database is established by the content provider for the purpose of generating automatic replies to text messages from subscribers according to keywords in the text messages. The auto-reply rule database includes a plurality of auto-reply rules including the above auto-reply rule, and each auto-reply rule represents a correlation between at least one keyword and one or more content items of the webpage.

In some implementations, the plurality of auto-reply rules stored in the auto-reply rule database are established by server computer 16. The set of predetermined tags are identified in the content information of the webpage. Then, the content information of the webpage is semantically analyzed according to the set of predetermined tags. In accordance with the semantic analysis, one or more keywords are extracted from part of the content information corresponding to a specific predetermined tag, and each key word is correlated with respective one or more content items associated with the part of the content information. Further, for each keyword of the specific predetermined tag, a respective auto-reply rule is generated, when corresponding information of the respective one or more content items is associated with a respective auto-reply message, and the server system is thereby configured to generate the respective auto-reply message in response to a corresponding text message that includes the respective keyword.

Under some circumstances, the content information of the webpage includes HTML source codes of the webpage that further include HTML tags, and the HTML tags are used to correlate keywords and content items of the webpage semantically. For instance, the HTML tags contains a specific tag for an address, e.g. "<div class="address">." Server computer 14 identifies this address tag, specifies one or more keywords containing "address," and associates the keywords with an address linked to this address tag in the HTML source codes. Specifically, a corresponding auto-reply rule is established to associate the keyword of "address" with an address of the content provider, e.g., "Tencent Building, Kejizhongyi Avenue, Hi-tech Park, Nanshan District, Shenzhen, China," as specified under the tag of "<div class="address">" in the corresponding HTML source codes.

In some embodiments, in accordance with the auto-reply rule, the specific keyword is directly represented by one of the predetermined tags and semantically correlated with corresponding content items marked up by the one of the predetermined tags, and the corresponding content items are included in the auto-reply message. As shown in the above example, the keyword of "address" is a part of the predetermined address tag "<div class="address">," and semantically correlated with the address of the content provider associated with the address tag. Further, the semantically correlated address of the content provider will be included in the corresponding auto-reply message in response to the text message received from client device 16.

In some implementations, the plurality of auto-reply rules stored in the auto-reply rule database are automatically established by server computer 16 based on the predetermined tags as explained above. However, in some implementations, the plurality of auto-reply rules are manually created or revised by a webmaster that represents the content provider and manages a public account subscribed by users of client devices 16. In this case, server computer 14 renders a GUI on host system 12 to allow the webmaster to create or edit the auto-reply rules, prior to storing the auto-reply rules in the auto-reply rule database.

In some implementations, after the auto-reply message is composed according to the specific word and the corresponding auto-reply rule, server computer 14 renders a GUI on host system 12 to allow the content provider to further compose the auto-reply message prior to returning the auto-reply message to client device 16. A preview of the webpage is generated for display on the GUI and for further editing the auto-reply message, and this webpage preview includes the plurality of content items of the webpage. Server computer 14 receives a user selection of a specific content item of the webpage in the webpage preview, and thereby composes the auto-reply message in accordance with the user selection of the specific content item. Thus, the auto-reply message further includes corresponding information of the selected specific content item displayed in the webpage.

In some embodiments, after the auto-reply message is composed, a preview of the auto-reply message is rendered and displayed on the GUI display of host system 12 according to a display format of client device 14. For example, if the text message and the auto-reply message are communicated on a WeChat platform, the preview of the auto-reply message is formatted according to requirements of the WeChat platform on the GUI display of host system 12. In various embodiments of the application, the GUI display of host system 12 is optionally based on the WeChat platform or another communication application that is distinct from WeChat.

In some embodiments, the content information of the webpage includes HTML source codes of the webpage that further include HTML tags and links to the plurality of content items, and the plurality of content items at least include texts and pictures. Therefore, in some embodiments, the predetermined tags in the HTML source codes include a "TITLE" tag that is associated with specific content, e.g., a URL address of the webpage. In accordance with an auto-reply rule, a specific keyword, e.g., "company website," is associated with the "TITLE" tag, and therefore, semantically associated with the URL address of the webpage based on the "TITLE" tag.

In some embodiments, the auto-reply rule database includes at least one keyword and a semantically correlated content item both of which are determined by the content provider independently of the set of predetermined tags. Stated another way, the content provider defines customized tags in addition to other commonly known tags (e.g., the HTML tags).

In some embodiments, the auto-reply message further includes content that is inputted by the content provider independently of the plurality of content items of the webpage. Specifically, host system 12 receives manual input from an input device of host system 12, such that the auto-reply message may be manually composed by a webmaster, before server system 14 returns the auto-reply message to client device 16. For instance, the webmaster may add, edit or delete some textual information to the auto-reply message.

In some embodiments, the webpage used to compose the auto-reply message includes a first webpage, and the auto-reply message further includes one or more content items associated with a second webpage that is distinct from the first webpage.

After composing the auto-reply message, server system 14 returns (24) the auto-reply message that includes the information of the at least one content item corresponding to the specific keyword for display on client device 16. In some embodiments, client device 16 is configured to receive and display the auto-reply message on a communication platform selected from an email message application, a social network application, an instant messaging application and the like. In a specific example, the auto-reply message is received and displayed on a WeChat platform.

Figure 2B:
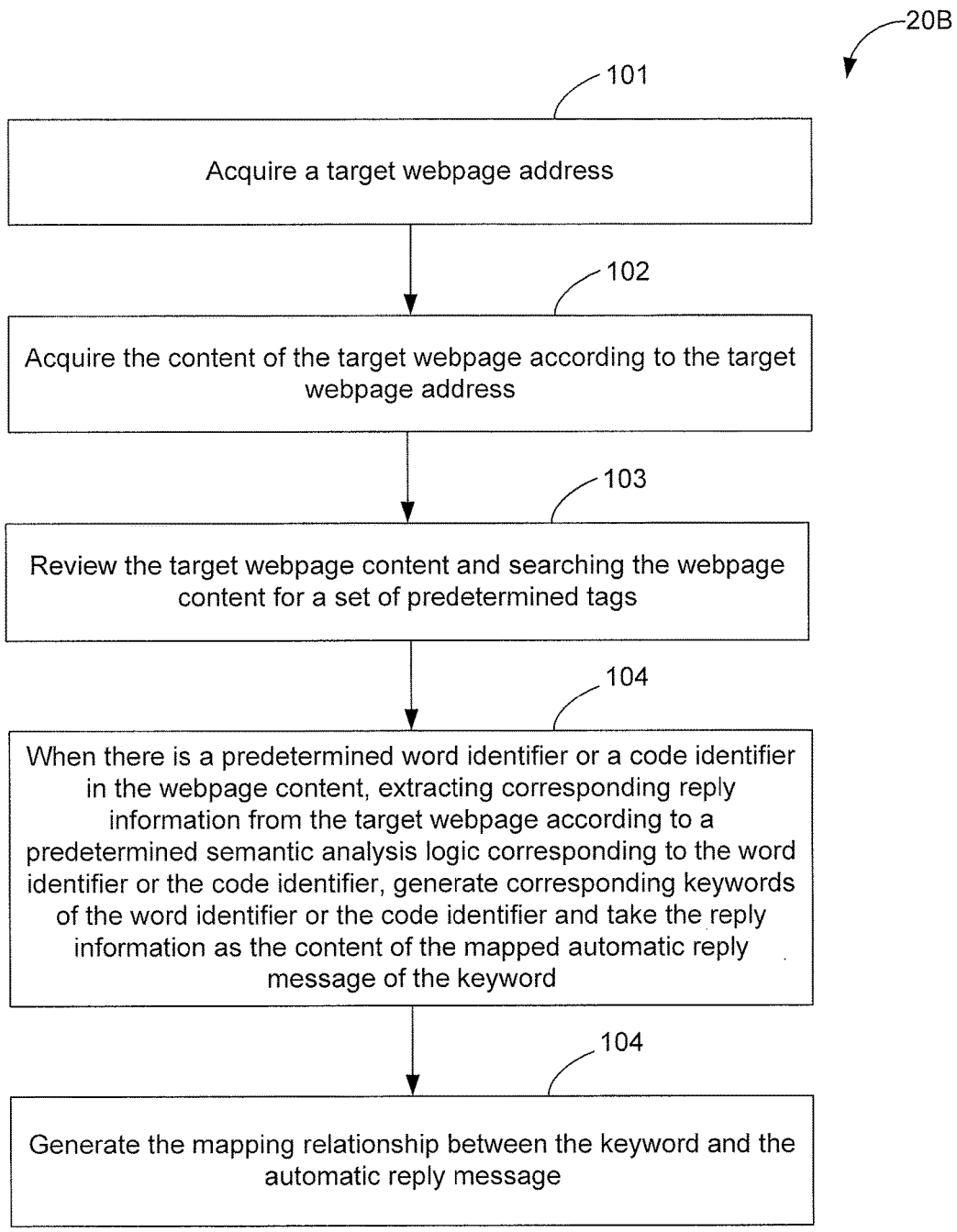
FIG. 2B illustrates a flow chart representing a method for generating keyword based auto-reply messages in an instant messaging application in accordance with some embodiments of the application.

It should be understood that the particular order in which the operations in FIG. 2A have been described are merely exemplary and are not intended to indicate that the described order is the only order in which the operations could be performed. One of ordinary skill in the art would recognize various ways to create auto-reply messages as described herein. Additionally, it should be noted that details of other processes described herein with respect to method 20B (e.g., FIG. 2B) are also applicable in an analogous manner to method 20A described above with respect to FIG. 2A. For brevity, these details are not repeated here.

FIG. 2B illustrates a flow chart representing a method 20B for generating keyword based auto-reply messages in an instant messaging (IM) application in accordance with some embodiments of the application. Method 20B is, optionally, governed by instructions that are stored in a non-transitory computer readable storage medium and that are executed by one or more processors of a host system (e.g., host system 12). Each of the operations shown in FIG. 2B may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 20B may be combined and/or the order of some operations may be changed.

Auto-reply generation method 20B is associated with GUI displays (e.g., FIGS. 3A-3D) that allows a webmaster to define the auto-reply rules in the auto-reply rule database. Specifically, FIGS. 3A-3D illustrate an exemplary webpage preview, an exemplary list of keyword-correlations, an exemplary auto-reply message editor for composing an auto-reply message, and an exemplary preview of an auto-reply message composed by an auto-reply message editor in accordance with some embodiments of the application, respectively. More details on composing the auto-reply rule based on the GUI displays are explained below.

With reference to FIG. 2B, it is assumed that auto-reply generation method 20B is directed to a public account A on a communication platform (e.g., an IM application). At Step 101, auto-reply generation method 20B includes acquiring a target webpage address. Here, the target webpage address can be provided by a user of public account A of the IM system based on different acquiring manners. For example, a loading interface for the target webpage address such as the interface in FIG. 3A may be provided, and the user of the public account may input the target webpage address into an input entry 201 of the interface from which the target webpage address is acquired.

Figure 3A:
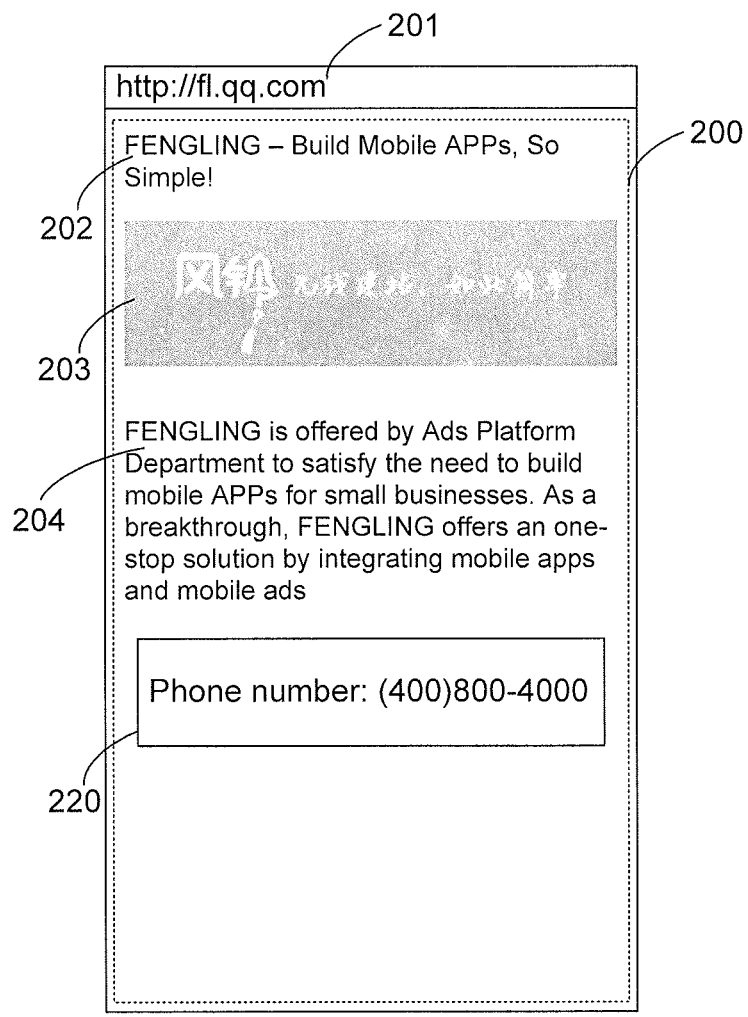
FIG. 3A illustrates an exemplary webpage preview that is displayed on a GUI of a host system in accordance with some embodiments of the application.

At Step 102, auto-reply generation method 20B further includes acquiring the content of the target webpage according to the target webpage address. In some implementations, an interface for display may not be loaded after acquiring the content of the target webpage, and otherwise the target webpage content may also be loaded into a dotted area 200 for display as shown in FIG. 3A. The existing web browser technology may be adopted to load the target webpage content, and detailed description is omitted here. As shown in the dotted area 200 of FIG. 3A, after the target webpage content is loaded, material content of the target webpage, such as a title "FENGLING—Build Mobile APPs, So Simple!" 202, a picture 203, a text 204, a phone number 220 and the like, are displayed on the interface.

At Step 103, auto-reply generation method 20B further includes reviewing the target webpage content and searching the webpage content for a set of predetermined tags (sometimes called word identifier or code identifier). In some implementations, a word identifier or code identifier and a semantic analysis method corresponding to the word identifier or code identifier are predetermined in order to realize the IM keyword automatic reply function and generate the keyword auto-reply correlation (i.e., the auto-reply rules) automatically. For example, the predetermined word identifier (sometimes called tag) may be commonly used keywords (e.g., "address," "tel"), or special keywords defined according to demands (e.g., "lottery"). The word identifier could also be the code identifier (i.e., tags) of a webpage or be replaced by the code identifier of the webpage. For example, the HTML tag "title" representing the title; the corresponding HTML tag associated with "address" may be "<div class="address">"; the corresponding HTML tag associated with "tel" may be "<div class="tel">"; and the corresponding HTML tag associated with "lottery" may be "<div class="lottery">."

At Step 104, if there is a predetermined word identifier or a code identifier in the webpage content, auto-reply generation method 20B further includes extracting corresponding reply information (e.g., information concerning content items) from the target webpage according to a predetermined semantic analysis method corresponding to the word identifier or the code identifier. Then, auto-reply generation method 20B further includes generating corresponding keywords of the word identifier or the code identifier and taking the reply information as the content of the auto-reply message corresponding to the keyword.

At Step 105, auto-reply generation method 20B further includes generating the correlation between the keyword and the automatic reply message, and specifically the correlation between the keyword and content items of the webpage for the purposes of composing the auto-reply message.

In some embodiments, the predetermined word identifier or the code identifier is associated with a predetermined semantic analysis method, and after identifying the predetermined word identifier or the code identifier, operations are performed according to the corresponding semantic analysis method for the word identifier or the code identifier.

For example, the corresponding semantic analysis method to process the keyword "title" includes the following steps: when finding the "title" through reviewing the target webpage, acquiring the content of title (such as a "home page"

and the like) from the target webpage and extracting the URL of the target webpage (such as, http://fl.qq.com); taking the content of Title (such as, the "home page") as the keyword, and taking the URL of the target webpage as the content of the correlated auto-reply message of the keyword; and then generating the correlation between the keyword and the automatic reply message, for example, an http://fl.qq.com is correlated with the keyword "home page."

Then, according to the existed keyword automatic reply function, when a user sends the information of "home page" to the public account from an IM client, the public platform system may conduct a matching with the keyword "home page" according to this information and then send the mapped automatic reply message of the keyword, i.e. "http://fl.qq.com" to the user's IM client.

In another example, the predetermined word identifier is a word of specified type or its equivalent code identifier (i.e., tag), and the corresponding semantic analysis method includes the following steps: if the word of specified type or its equivalent code identifier is found in the target webpage through traversing, analyzing whether the text after the word of specified type or its equivalent code identifier in the target webpage conforms to the corresponding writing norms of the word of specified type; and if the writing norms is complied with, extracting the text conforming to the writing norms, taking the word of specified type as the keyword, and taking the text conforming to the writing norms as the content of the mapped automatic reply message of the keyword.

Exemplary tags include, but are limited to, "address," "tel," "email," and "qq." More details on auto-reply generation methods 20B based on these tags are explained below.

Assuming that the predetermined word identifier is "address" or its equivalent code identifier such as "<div class="address">," then the corresponding semantic analysis method includes the following steps: when finding the "address" or "<div class="address">" in the target webpage through traversing, analyzing whether the text after the "address" or the "<div class="address">" in the target webpage conforms to the address writing norms, for example "XX province XX city XX road XX number"; if the address writing norms is met, extracting the text conforming to the address writing norms such as "XX province XX city XX way XX number," taking the "address" as the keyword, and taking the text conforming to the address writing norms as the content of the mapped automatic reply message of the keyword; and establishing the correlation between the "address" and the "XX province XX city XX road XX number." Then, according to the existed keyword automatic reply function, when a user sends the information of "address" to the public account from an IM client, the public platform system may conduct a matching with the keyword "address" according to this information and then send the mapped automatic reply message of the keyword, i.e. "XX province XX city XX road XX number" to the user's IM client.

Assuming that the predetermined word identifier is "tel" or its equivalent code identifier such as "<div class="tel">," then the corresponding semantic analysis method includes the following steps: when finding the "tel" or "<div class="tel">" in the target webpage through traversing, analyzing whether the text after the "tel" or the "<div class="tel">" in the target webpage conforms to the tel number writing norms, for example "010-12345678"; if the phone number writing norms is met, extracting the text conforming to the tel number writing norms such as "010-12345678," taking the "tel" as the keyword, and taking the text conforming to the address writing norms as the content of the mapped automatic reply message of the keyword; and establishing the correlation between the "tel" and the "010-12345678." Then, according to the existed keyword automatic reply function, when a user sends the information of "tel" to the public account from an IM client, the public platform system may conduct a matching with the keyword "tel" according to this information and then send the mapped automatic reply message of the keyword, i.e. "010-12345678" to the user's IM client.

In another example, the predetermined word identifier is a word of specified type or its equivalent code identifier, and the corresponding semantic analysis method includes the following steps: acquiring the URL of the target webpage, taking the word of specified type as the keyword, and taking the URL of the target webpage as the content of the mapped automatic reply message of the keyword.

Assuming that the predetermined word identifier is "lottery" or its equivalent code identifier such as "<div class="lottery">," then the corresponding semantic analysis method includes the following steps: when finding the "lottery" or "<div class="lottery">" in the target webpage through traversing, acquiring the URL "http://fl.qq.com" of the target webpage, taking the "lottery" as the keyword, and taking the URL of the target webpage as the content of the mapped automatic reply message of the keyword; and establishing the correlation between the "lottery" and the "http://fl.qq.com." Then, according to the existed keyword automatic reply function, when a user sends the information of "lottery" to the public account from an IM client, the public platform system may conduct a matching with the keyword "lottery" according to this information and then send the mapped automatic reply message of the keyword, i.e. "http://fl.qq.com" to the user's IM client.

In some embodiments of the present application, at Step 106, auto-reply generation method 20B further includes displaying a list of the keyword auto-reply correlations and receiving an instruction of selecting the keyword auto-reply correlation from the user.

Figure 3B:
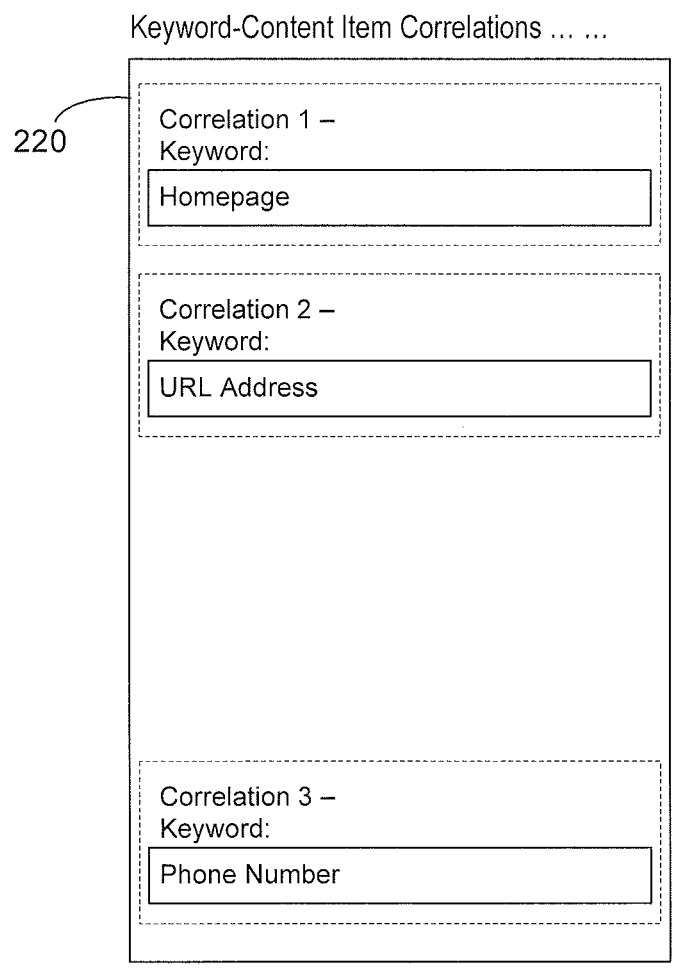
FIG. 3B illustrates an exemplary list of keyword-content item correlations associated with the webpage shown in FIG. 3A in accordance with some embodiments of the application.

FIG. 3B illustrates an exemplary list 220 of keyword-content correlations associated with the webpage shown in FIG. 3A in accordance with some embodiments of the application. With reference to FIG. 3B, the list 220 of the keyword auto-reply correlations includes various correlations generated by the above-mentioned method, wherein the correlations are distinguished according to the keywords. For example, the keyword of a correlation 1 is "homepage," the keyword of a correlation 2 is "address," and the keyword of a correlation 3 is "tel."

The user of the public account may click the correlations in the list 220 of the automatic reply correlation to make a selection, and after a certain correlation is selected by clicking, an editor corresponding to the correlation will be triggered and the user may edit the correlation.

At Step 107, auto-reply generation method 20B further includes displaying an automatic reply message editor corresponding to the keyword auto-reply correlation selected by the user.

Figure 3C:
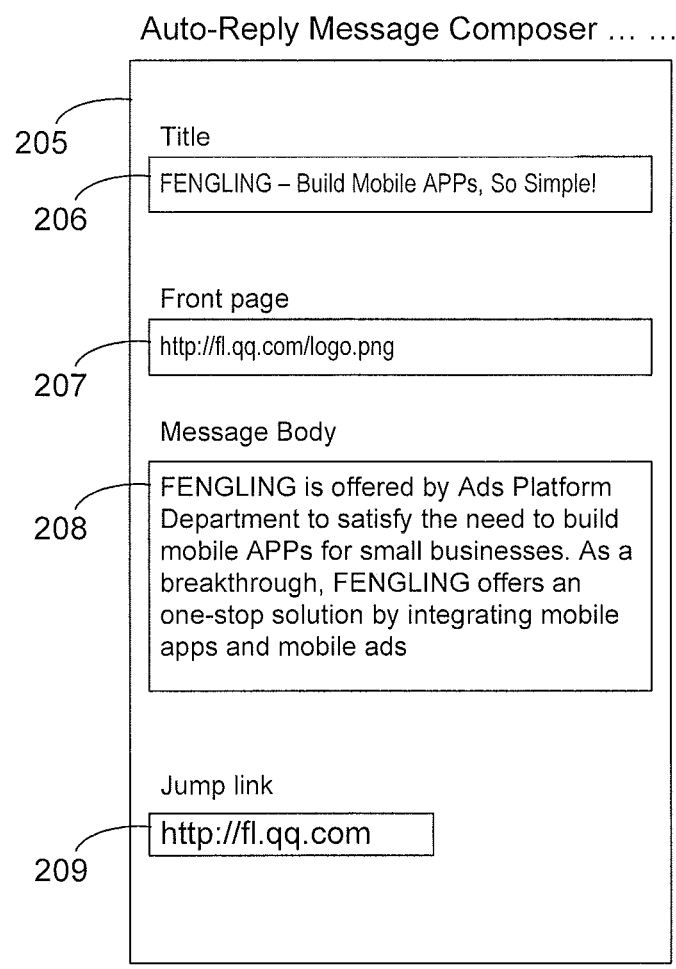
FIG. 3C illustrates an exemplary auto-reply message editor for composing an auto-reply message in accordance with some embodiments of the application.

Assume that the user clicks the correlation 1 of FIG. 3B. As shown in FIG. 3C, an auto-reply message editor is displayed for composing an auto-reply message, and specifically for defining the corresponding auto-reply rule including the keyword-content correlation. With reference to FIG. 3C, at least the keyword "homepage" of the correlation 1 and the mapped content "http://fl.qq.com" thereof are included. According to the present application, the "home page" is added to a title type entry 206 and the http://fl.qq.com is added to a jump link entry 209 automatically.

At Step 108, auto-reply generation method 20B further includes receiving an edit instruction from the user to the editor and editing the keyword and/or the content of the mapped automatic reply message thereof according to the edit instruction.

For example, the user may click the title type entry 206 to edit and modify the keyword therein, and according to the present application, the keyword is edited according to the edit instruction. The user may also click the jump link entry 209, and, according to the present application, the URL (i.e., the content of the automatic reply message) may be edited and modified according to the user's edit instruction.

In addition, in some embodiments, in order to improve the efficiency of editing and modifying the automatic replay message content by the user, the method of the present application may further include loading the target webpage content and conducting identification and type-marking on the material in the target webpage.

In the dotted area 200 as shown in FIG. 3A, the content of the target webpage may be loaded. It is required to identify the content items of the target webpage and the content types of these content items of the target webpage. In some embodiments, the content items of the target webpage and their corresponding content types are identified by: analyzing the webpage content automatically, identifying corresponding material from the target webpage content according to a material type tag of a source code of the target webpage or a customized material tag made in a webpage source code, and conducting type-marking on the material identified according to the tag type. For example, identifying the webpage title through a Title tag and marking a title type for the webpage title; obtaining the webpage address through a URL tag and marking an address type for the webpage address; identifying the picture material according to a <img> tag and marking a picture type for the picture; identifying the text material through a <article> provided by the HTML5 and marking a text type for the text; and identifying the telephone call material through a <div class='widget-call'> tag customized in the webpage source code and marking a telephone call type for the telephone call material.

In this embodiment, editing the content of the automatic reply message according to the edit instruction specifically includes the following step.

Step 181, receiving a select instruction for the material in the target webpage from the user, adding corresponding entry of the material type to the automatic reply message editor according to the type mark of the material selected by the user, and adding the content of the material selected by the user to the corresponding entries of the material type added to the automatic reply message editor.

In this step, user participation is required, but the operation of the user is very simple. The user only needs to click material that he or she wishes to add into the automatic reply message in the dotted area 202 shown in FIG. 3A to add the clicked material into the corresponding entry of the material type of the automatic reply message editor shown in FIG. 3C, and the operation is very simple and highly-effective.

For example, when the user clicks the picture 203 in FIG. 3A, which may be captured by using technologies such as JavaScript at front end and the like, and the click operation is the select instruction to the material clicked. After receiving the select instruction, according to the present application, that the material is of the picture type is determined according to the type mark of the material selected by the user, a picture type entry 207 is added to the automatic reply message editor of FIG. 3C and the address of the picture clicked by the user is added to the picture type entry 207 automatically. If the user then clicks the text 204 in FIG. 3A, after receiving the select instruction, according to the present application, a text type entry 208 is added to the automatic reply message editor of FIG. 3C according to the type mark (being the text type here) of the material selected by the user and adds the text content of the text clicked by the user to the text type entry 208 automatically.

Finally, according to the present application, the automatic reply message is generated according to the content of the entries in the automatic reply message editor. For example, an automatic reply message including the title 206, the picture 207, the text content 208 and the jump link 209 can be generated according to the content of the entries in the automatic reply message editor as shown in FIG. 3C.

In a preferred embodiment of the present application, based on the embodiment of FIG. 1, the present application may further includes generating a preview interface of the automatic reply message according to the content of the entries of the automatic reply message editor in real time, wherein the preview display of the current content of the entries of the automatic reply message editor is presented in a display format of an IM client.

Figure 3D:
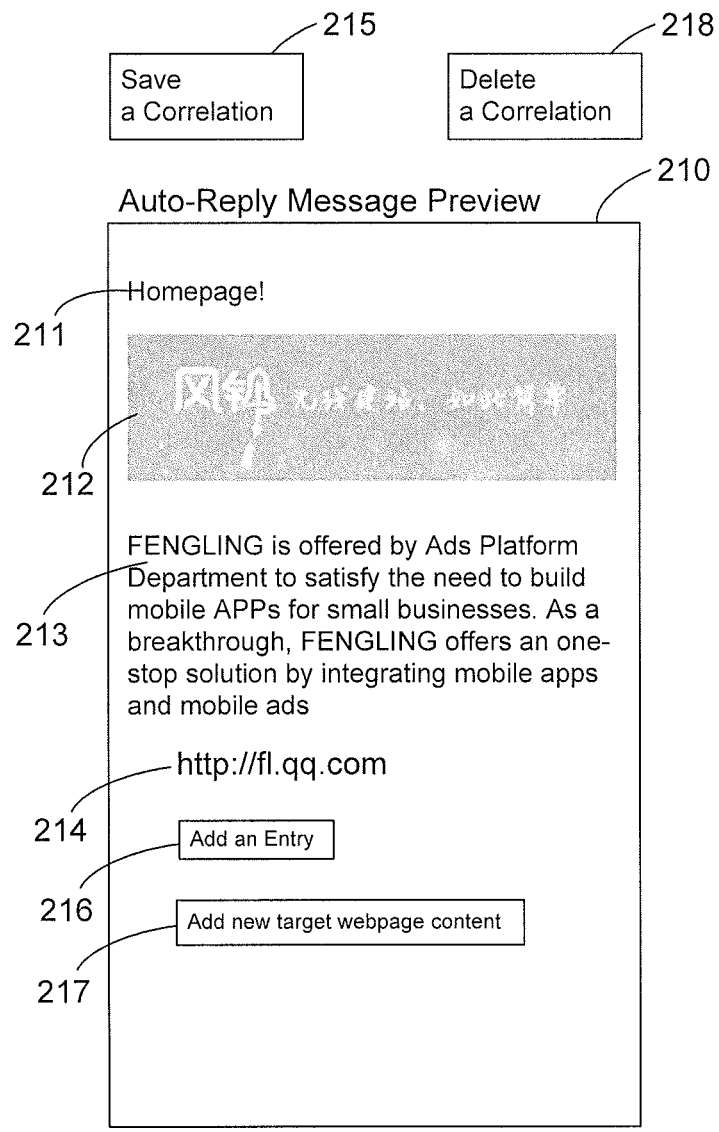
FIG. 3D illustrates an exemplary preview of an auto-reply message composed by an auto-reply message editor in accordance with some embodiments of the application.

FIG. 3D is a schematic diagram of a preview interface of an automatic reply message generated in real time according to the content of the entries of the automatic reply message editor shown in FIG. 3C. In a preferred embodiment, as long as the content of an entry of the automatic reply message editor increases or changes, the preview interface will change in real time accordingly and present the preview display of the current content of the entries of the automatic reply message editor in the display format of the IM client. An preview interface 210 of an automatic reply message generated according to the content of the entries of the automatic reply message editor shown in FIG. 3C is shown in the preview interface of FIG. 3D, wherein the process includes generating a corresponding title 211 according to the content of the title entry 206, acquiring a corresponding picture 212 according to the address shown in the picture type entry 207 and displaying the picture, generating text 213 according to the content of the text type entry 208, and generating a jump link 214 according to the content of the jump link entry 209. If the user considers that the content of the automatic reply message is correct by viewing the preview interface 210 of the automatic reply message, then the user may click a "save correlation" button 215 to save the content of the automatic reply message and its correlation with the keyword "home page." The user may also click a "delete correlation" button 218 to delete the correlation 1 including the keyword and the content of the mapped automatic reply message thereof.

In addition, in a further embodiment based on any one of the embodiments described above, the present application may further include: receiving an edit instruction from the user to the automatic reply message editor and editing the content of an entries in the automatic reply message editor according to the editing instruction. For example, if the user clicks the text type entry 208 in the automatic reply message editor of FIG. 3C, a process for editing the content of the text type entry is triggered, and then the user may modify the text content. While the user edits and modifies the content of the text type entry, the content of text 213 in the preview interface of FIG. 3D may also change in real time and synchronously.

In a further embodiment based on any one of the embodiments described above, according to the present application, an instruction of adding a entry of a material type may be also received from the user to add a corresponding entry of the material type to the automatic reply message editor according to the instruction; and an instruction of editing in the entry of the material type may be received from the user to edit the content of the entry of the material type according to the edit instruction. For example, as shown in FIG. 3D, the user may click a "add an entry" button 216 to issue an instruction of adding a entry of a material type, and then a entry of a material type is be added to the automatic reply message editor. The specific type of the entry of the material type may be selected and set by the user, and the content of the entry of the material type may be edited by the user. After editing in the added entry of the material type, the preview interface 210 may take a preview display of the automatic reply message including the newly added entry of the material type in real time.

In some embodiments, according to the present application, an instruction of adding new target webpage content may be also received from the user and then the steps of the above embodiment including step 181 may be repeated with respect to the new target webpage address, which is: receiving a select instruction for the material in a new target webpage for the user, adding corresponding entry of the material type to the automatic reply message editor according to the type mark of the material selected by the user, and adding the content of the material selected by the user to the corresponding entries of the material type added to the automatic reply message editor.

For example, when the user clicks an "add new target webpage content" button 217 in FIG. 3D, a new loading interface which is similar to the loading interface shown in FIG. 3A appears, and the user of the public account may input a target webpage address to the input entry 201 of the new loading interface. According to the present application, the target webpage address is acquired from the address input entry, the new target webpage content is loaded into the loading interface to identify the material in the new target webpage, an instruction of selecting the material of the target webpage from the user, a corresponding entry of the material type is added to the automatic reply message editor shown in FIG. 3B and the content of the material selected by the user is added to the added corresponding entry of the material type of the automatic reply message editor. Thus, the material contents of a plurality of target webpages may be added to an automatic reply message collectively, thereby improving the richness of the content of the automatic reply message.

Corresponding to the above-mentioned method, the present application also discloses an apparatus for generating a keyword auto-reply correlation in IM. In various embodiments of the present application, the keyword auto-reply correlation is associated with the keyword content correlation and the auto-reply rule, and they are used in an exchangeable manner.

Figure 4A:
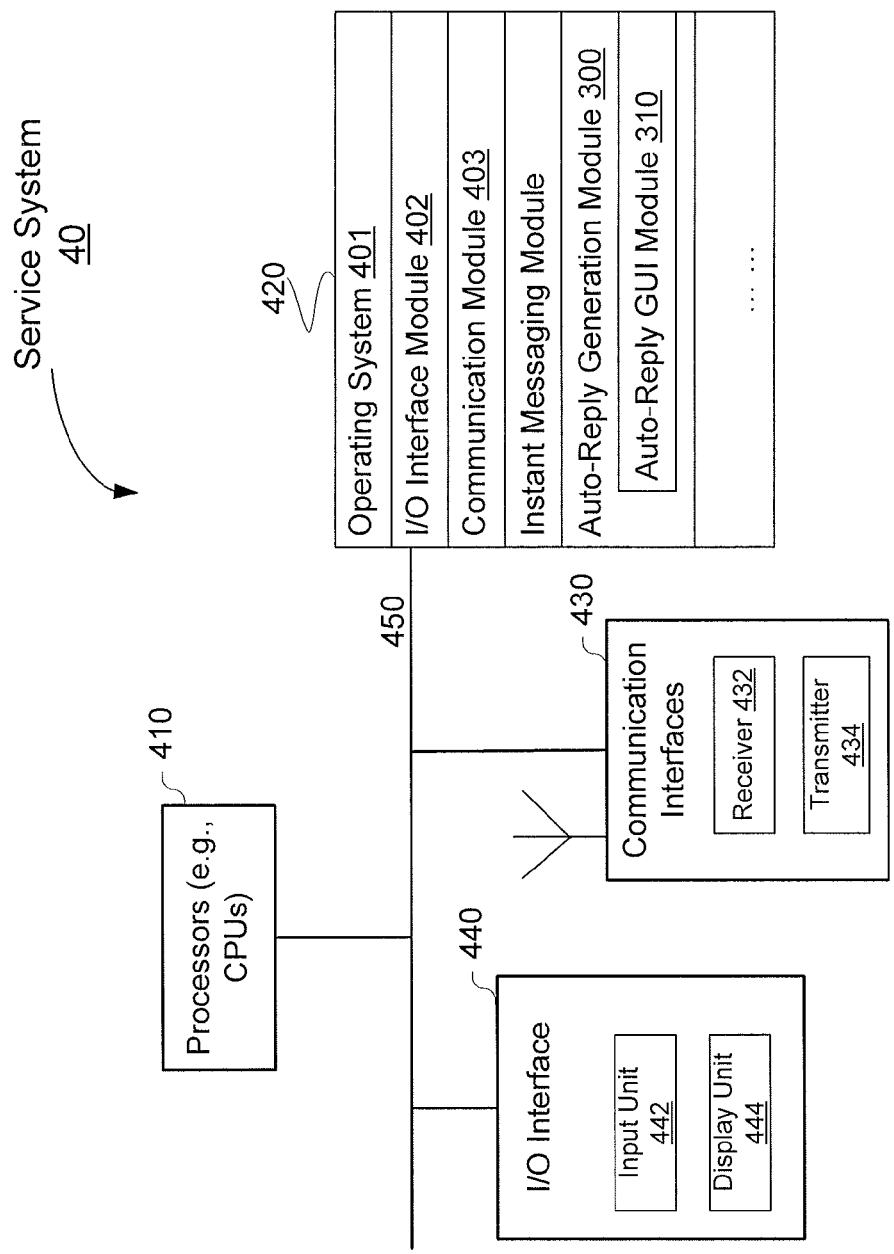
FIG. 4A illustrates a block diagram of a server system that creates an auto-reply message according to an auto-reply rule in accordance with some embodiments of the application.

FIG. 4A illustrates a block diagram of a server system that creates an auto-reply message according to an auto-reply rule in accordance with some embodiments of the application. In some implementations, server system 14 at least includes one or more processors 410 (e.g., central processing units) and a memory 420 for storing data, programs and instructions for execution by one or more processors 410. In some implementations, server system 14 further includes one or more communication interfaces 430, an input/output (I/O) interface 440, and one or more communication buses 450 that interconnect these components.

In some embodiments, I/O interface 440 includes an input unit 442 and a display unit 444. Examples of input unit 442 include a keyboard, a mouse, a touch pad, a game controller, a function key, a trackball, a joystick, a microphone, a camera and the like. Additionally, display unit 444 displays information that is inputted by the user or provided to the user for review. Examples of display unit 444 include, but are not limited to, a liquid crystal display (LCD) and an organic light-emitting diode (OLED) display. In some implementations, input unit 442 and display unit 444 are integrated on a touch-sensitive display that displays a graphical user interface (GUI).

In some embodiments, communication buses 530 include circuitry (sometimes called a chipset) that interconnects and controls communications between system components. In some embodiments, communication interfaces 430 further include a receiver 432 and a transmitter 434.

In some embodiments, memory 420 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 420 includes one or more storage devices remotely located from the one or more processors 410. In some embodiments, memory 420, or alternatively the non-volatile memory device(s) within memory 420, includes a non-transitory computer readable storage medium.

In some embodiments, memory 420 or alternatively the non-transitory computer readable storage medium of memory 420 stores the following programs, modules and data structures, instructions, or a subset thereof:

Operating System 401 that includes procedures for handling various basic system services and for performing hardware dependent tasks;

I/O interface module 402 that includes procedures for handling various basic input and output functions through one or more input and output devices, wherein I/O interface module 402 further includes an interface display module that controls displaying of a graphical user interface;

Communication module 403 that is used for connecting server system 14 to other computational devices (e.g., servers and client devices), via one or more network communication interfaces 450 (wired or wireless) and one or more communication networks, such as the Internet, other wide area networks, local area networks, metropolitan area networks, and so on;

Auto-reply generation module 300 that creates auto-reply rules and creates auto-reply messages according to one or more keywords and the corresponding auto-reply rules. In some embodiments, auto-reply generation module 300 at least includes an auto-reply GUI module 310 that renders the GUIs on host system 12 for defining the auto-reply rules and/or composing auto-reply messages. In some embodiments, auto-reply generation module 300 further includes some of modules 301-309 as shown below in FIGS. 4B and 4C. More details on auto-reply generation module 300 are also explained above with reference to FIGS. 1, 2A-2B and 3A-3D.

In some embodiments, like server system 14, host system 12 and client device 16 include their respective one or more processors 410, memory 420, communication interfaces 430, and I/O interface 440. Respective memory 420 includes operating system 401, I/O interface module 402, and communication module 403. Further, in some embodiments, client device 16 further includes at least one communication platform module (e.g., instant messaging module 404 or a social network module). This communication platform module provides a communication platform for its users to interact with each other. In a specific example, the communication platform supports a public account which individual private users may subscribe to, and a business user may establish such a public group to provide information relevant to its products or services to its subscribers.

The auto-reply messages created by auto-reply generation module 300 of server system 14 are required to have a format compatible with the corresponding communication platform on client device 16. In some embodiments, the GUI for composing the auto-reply message is embedded in a communication platform installed on client system 102. In some embodiments, the GUI for composing the auto-reply message is enabled by an application independent of the communication platform.

Figure 4B:
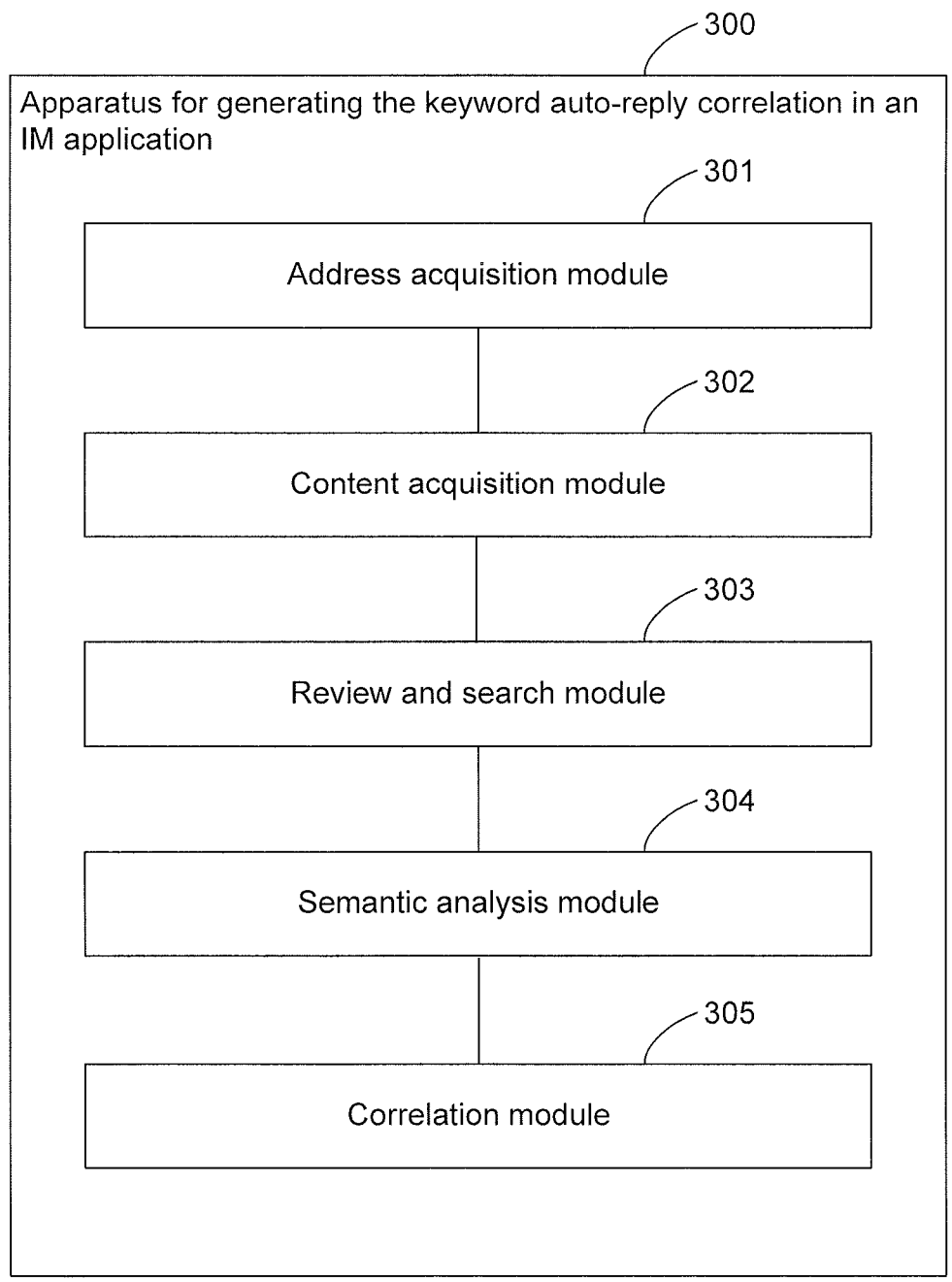
FIG. 4B illustrates a block diagram of a keyword based auto-reply generation module associated with an instant messaging application in accordance with some embodiments of the application.

FIG. 4B illustrates a block diagram of a keyword based auto-reply generation module associated with an instant messaging application in accordance with some embodiments of the application. Auto-reply generation module 300 further includes the following modules:

- an address acquisition module 301 for acquiring the target webpage address;
- a content acquisition module 302 for acquiring the content of the target webpage according to the target webpage address;
- a review and search module 303 for reviewing the target webpage content and searching in the webpage content for a predetermined word identifier or code identifier;
- a semantic analysis module 304 for extracting corresponding reply information from the target webpage according to a predetermined semantic analysis method corresponding to the word identifier or the code identifier if there is a predetermined word identifier or a code identifier in the webpage content, generating corresponding keywords of the word identifier or the code identifier and taking the reply information as the content of the automatic reply message correlated with the keyword; and
- a correlation module 305 for establishing an auto-reply rule by generating the correlation between the keyword and the automatic reply message.

Figure 4C:
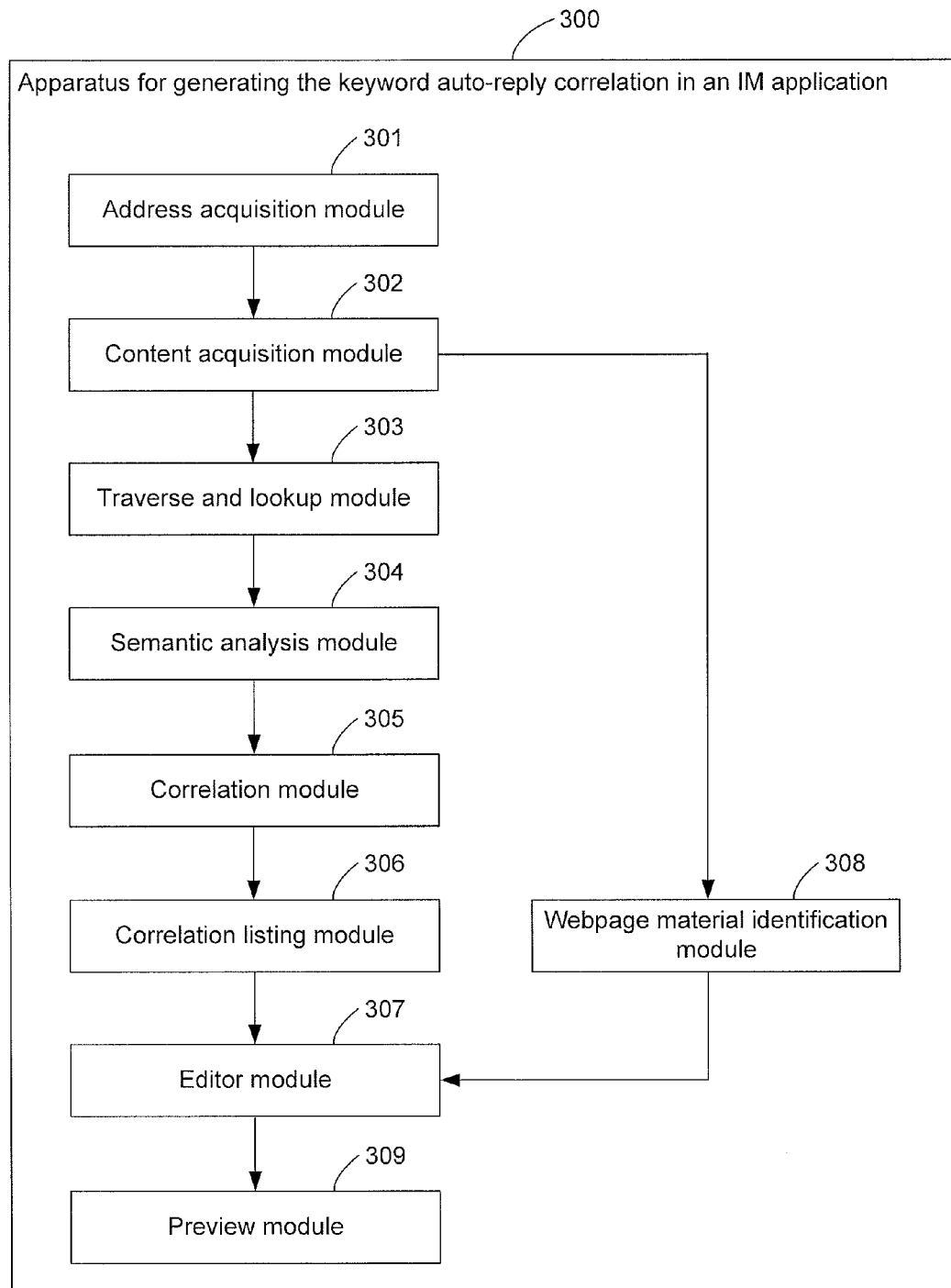
FIG. 4C illustrates a block diagram of another keyword based auto-reply generation module associated with an instant messaging application in accordance with some embodiments of the application.

FIG. 4C illustrates a block diagram of another keyword based auto-reply generation module associated with an instant messaging application in accordance with some embodiments of the application. Auto-reply generation module 300 further includes the following modules:

- a correlation listing module 306 for displaying the list of the keyword auto-reply correlation as shown in FIG. 3B and receiving a select instruction for the keyword auto-reply correlation from the user; and
- an editor module 307 for displaying the automatic reply message editor corresponding to the keyword auto-reply correlation selected by the user as shown in FIG. 3C, receiving an edit instruction from the user to the editor and editing the keyword and/or the content of the automatic reply message correlated with the keyword according to the edit instruction.

In addition, in some embodiments, the apparatus may further includes a webpage material identification module 308 for loading target webpage content as shown in FIG. 3A and conducting identification and type-marking on the material of the target webpage.

The editor module 307 is further used to receive a select instruction for the material in a new target webpage for the user, add corresponding entry of the material type to the automatic reply message editor according to the type mark of the material selected by the user, and add the content of the material selected by the user to the corresponding entries of the material type added to the automatic reply message editor.

In further embodiment, the apparatus may further includes a preview module 309 for generating a preview interface of the automatic reply message according to the content of the entries of the automatic reply message editor in real time, as shown in FIG. 3D, wherein the preview display of the current content of the entries of the automatic reply message editor is presented in the display format of the IM client.

Moreover, the apparatus further includes an entry adding module for receiving an instruction of adding an entry of a material type from the user and adding a corresponding entry of the material type to the automatic reply message editor. The editor module is further used to receive an instruction of editing the added entry of the material type from the user and edit the content of the entry of the material type according to the editing instruction.

Moreover, the apparatus may further includes a webpage content adding module for receiving an instruction of adding new target webpage content from the user, invoking the editor module to receive an select instruction for the material of the new target webpage from the user with respect to the new target webpage address, adding a corresponding entry of a material type to the editor according to the type mark of the material selected by the user and adding the content of the material selected by the user to the corresponding entry of the material type added to the editor.

In some embodiments, the semantic analysis method is associated with the predetermined code identifier of title, and including the steps of: acquiring the content of title and the URL of the target webpage from the target webpage, taking the content of title as the keyword and taking the URL of the target webpage as the content of the automatic reply message correlated with the keyword.

In some embodiments, the semantic analysis method is associated with the predetermined word identifier of a word of specified type or its equivalent code identifier. The semantic analysis method further includes: analyzing whether the text after the word of specified type or its equivalent code identifier in the target webpage conforms to the corresponding writing norms of the word of specified type; and if the writing norms is met, extracting the text conforming to the writing norms, taking the word of specified type as the keyword, and taking the text conforming to the writing norms as the content of the automatic reply message correlated with the keyword.

In some embodiments, the semantic analysis method further includes: acquiring the URL of the target webpage, taking the word of specified type as the keyword and taking the URL of the target webpage as the content of the automatic reply message correlated with the keyword.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of generating an automatic reply (auto-reply) message, comprising:

on a server system having one or more processors and memory storing one or more programs for execution by the one or more processors, the server system hosting a public platform of an instant messaging application:

receiving, from a client device and via the public platform, a text message directed to a content provider related to the public platform, the text message including a specific keyword;

obtaining content information of a webpage associated with the content provider related to the public platform, the content information of the webpage comprising a set of predetermined tags and information concerning a plurality of content items that are displayed together in the webpage;

in accordance with the specific keyword of the text message, identifying an auto-reply rule associated with the specific keyword in an auto-reply rule database that comprises a plurality of keywords including the specific keyword, wherein the auto-reply rule database correlates each of the plurality of keywords semantically with respective one or more content items of the webpage based on the set of predetermined tags in the content information of the webpage;

associating the specific keyword with one of the set of predetermined tags in the content information of the webpage according to the auto-reply rule associated with the specific keyword; and in accordance with the associated one of the set of predetermined tags, identifying and extracting from the webpage at least one content item corresponding to the specific keyword;

composing an auto-reply message, the auto-reply message including (i) a preview of the webpage further including the at least one content item extracted from the webpage and (ii) a user-actionable URL address corresponding to the webpage in a message body; and in response to the text message, returning the auto-reply message that is composed based on the information of the at least one content item, identified and extracted from the webpage, corresponding to the specific keyword for display on the client device.

2. The method of claim 1, further comprising establishing a plurality of auto-reply rules including the auto-reply rule associated with the specific keyword by:

identifying the set of predetermined tags in the content information of the webpage;

semantically analyzing the content information of the webpage according to the set of predetermined tags;

in accordance with the semantic analysis, extracting one or more keywords from part of the content information corresponding to a specific predetermined tag, wherein each key word is correlated with respective one or more content items associated with the part of the content information; and for each keyword of the specific predetermined tag, generating a respective auto-reply rule by associating corresponding information of the respective one or more content items with a respective auto-reply message, wherein the server system is configured to generate the respective auto-reply message in response to a corresponding text message that includes the respective keyword.

3. The method of claim 1, wherein the auto-reply rule database is established by the content provider for the purpose of generating automatic replies to text messages from subscribers according to keywords in the text messages.

4. The method of claim 1, wherein the auto-reply rule database comprises at least one keyword and a semantically correlated content item both of which are determined by the content provider independently of the set of predetermined tags.

5. The method of claim 1, further comprising:
rendering a graphical user interface (GUI) on a host system, distinct from the client device, for the content provider to compose the auto-reply message;
generating an initial preview of the webpage in the GUI for further editing the auto-reply message, the initial preview including the plurality of content items of the webpage;
composing the auto-reply message in accordance with a user selection of a specific content item of the webpage in the initial preview, wherein the auto-reply message further comprises corresponding information of the selected specific content item displayed in the webpage.

6. The method of claim 5, further comprising:
on the GUI display of the host system, rendering a preview of the auto-reply message according to a display format of the client device.

7. The method of claim 1, wherein the auto-reply message further comprises content that is inputted by the content provider independently of the plurality of content items of the webpage.

8. The method of claim 1, wherein the webpage comprises a first webpage, and the auto-reply message further comprises one or more content items associated with a second webpage that is distinct from the first webpage.

9. The method of claim 1, wherein the client device is configured to enable the text message and receive the auto-reply message on the instant messaging application.

10. The method of claim 1, wherein the content information of the webpage comprises HTML source codes of the webpage that further comprise HTML tags and links to the plurality of content items, and the plurality of content items at least include texts and pictures.

11. The method of claim 10, wherein the predetermined tags in the HTML source codes comprise a "TITLE" tag, and in accordance with the auto-reply rule, specific content marked up by the "TITLE" tag represents the specific keyword and is semantically correlated with the corresponding uniform resource locator (URL) of the webpage.

12. The method of claim 1, wherein in accordance with the auto-reply rule, the specific keyword is directly represented by the one of the predetermined tags and semantically correlated with corresponding content items marked up by the one of the predetermined tags, and the corresponding content items are included in the auto-reply message, the corresponding content items including the at least one content item.

13. A server system, wherein the server system hosts a public platform of an instant messaging application, comprising:
one or more processors; and
memory having instructions stored thereon, which when executed by the one or more processors cause the processors to perform operations comprising:
receiving, from a client device and via the public platform, a text message directed to a content provider related to the public platform, the text message including a specific keyword;
obtaining content information of a webpage associated with the content provider related to the public platform, the content information of the webpage comprising a set of predetermined tags and information concerning a plurality of content items that are displayed together in the webpage;
in accordance with the specific keyword of the text message, identifying an auto-reply rule associated with the specific keyword in an auto-reply rule database that comprises a plurality of keywords including the specific keyword, wherein the auto-reply rule database correlates each of the plurality of keywords semantically with respective one or more content items of the webpage based on the set of predetermined tags in the content information of the webpage;
associating the specific keyword with one of the set of predetermined tags in the content information of the webpage according to the auto-reply rule associated with the specific keyword; and
in accordance with the associated one of the set of predetermined tags, identifying and extracting from the webpage at least one content item corresponding to the specific keyword;
composing an auto-reply message, the auto-reply message including (i) a preview of the webpage further including the at least one content item extracted from the webpage and (ii) a user-actionable URL address corresponding to the webpage in a message body; and
in response to the text message, returning the auto-reply message that is composed based on the information of the at least one content item, identified and extracted from the webpage, corresponding to the specific keyword for display on the client device.

14. The server system of claim 13, wherein the auto-reply rule database is established by the content provider for the purpose of generating automatic replies to text messages from subscribers according to keywords in the text messages.

15. The server system of claim 13, wherein the auto-reply rule database further comprises at least one keyword and a semantically correlated content item both of which are determined by the content provider independently of the set of predetermined tags.

16. The server system of claim 13, wherein the client device is configured to enable the text message and receive the auto-reply message on the instant messaging application.

17. A non-transitory computer-readable medium, having instructions stored thereon, which when executed by one or more processors cause the processors to perform operations comprising:
at a server system hosting a public platform of an instant messaging application:
receiving, from a client device and via the public platform, a text message directed to a content provider related to the public platform, the text message including a specific keyword;

obtaining content information of a webpage associated with the content provider related to the public platform, the content information of the webpage comprising a set of predetermined tags and information concerning a plurality of content items that are displayed together in the webpage;

in accordance with the specific keyword of the text message, identifying an auto-reply rule associated with the specific keyword in an auto-reply rule database that comprises a plurality of keywords including the specific keyword, wherein the auto-reply rule database correlates each of the plurality of keywords semantically with respective one or more content items of the webpage based on the set of predetermined tags in the content information of the webpage;

associating the specific keyword with one of the set of predetermined tags in the content information of the webpage according to the auto-reply rule associated with the specific keyword; and in accordance with the associated one of the set of predetermined tags, identifying and extracting from the webpage at least one content item corresponding to the specific keyword;

composing an auto-reply message, the auto-reply message including (i) a preview of the webpage further including the at least one content item extracted from the webpage and (ii) a user-actionable URL address corresponding to the webpage in a message body; and in response to the text message, returning the auto-reply message that is composed based on the information of the at least one content item, identified and extracted from the webpage, corresponding to the specific keyword for display on the client device.

18. The non-transitory computer-readable medium of claim 17, wherein the auto-reply message further comprises content that is inputted by the content provider independently of the plurality of content items of the webpage.

19. The non-transitory computer-readable medium of claim 17, wherein the webpage comprises a first webpage, and the auto-reply message further comprises one or more content items associated with a second webpage that is distinct from the first webpage.

20. The non-transitory computer-readable medium of claim 17, wherein the content information of the webpage comprises HTML source codes of the webpage that further comprise HTML tags and links to the plurality of content items, and the plurality of content items at least include texts and pictures.

* * * * *